(12) United States Patent
Horn et al.

(10) Patent No.: US 10,062,396 B1
(45) Date of Patent: Aug. 28, 2018

(54) PLATTER SUPPORTED AND DRIVEN TURNTABLE

(71) Applicants: Cynthia Bennett Horn, Pittsburgh, PA (US); Theodore S. Wills, Pittsburgh, PA (US)

(72) Inventors: Cynthia Bennett Horn, Pittsburgh, PA (US); Theodore S. Wills, Pittsburgh, PA (US)

( * ) Notice: Subject to any disclaimer, the term of this patent is extended or adjusted under 35 U.S.C. 154(b) by 0 days.

(21) Appl. No.: 15/841,208

(22) Filed: Dec. 13, 2017

Related U.S. Application Data

(60) Provisional application No. 62/529,118, filed on Jul. 6, 2017.

(51) Int. Cl.
*G11B 3/60* (2006.01)
*G11B 3/14* (2006.01)
*G11B 19/20* (2006.01)
*G11B 33/08* (2006.01)

(52) U.S. Cl.
CPC ............ *G11B 3/60* (2013.01); *G11B 3/14* (2013.01); *G11B 19/20* (2013.01); *G11B 33/08* (2013.01)

(58) Field of Classification Search
None
See application file for complete search history.

(56) References Cited

U.S. PATENT DOCUMENTS

| 3,082,635 | A |   | 3/1963 | Grado |  |
|---|---|---|---|---|---|
| 4,475,184 | A | * | 10/1984 | Cooper | G11B 33/08 |
|  |  |  |  |  | 248/560 |
| 4,475,185 | A | * | 10/1984 | Fujio | G11B 19/2018 |
|  |  |  |  |  | 369/265 |
| 6,296,238 | B1 | * | 10/2001 | Lund-Andersen | F16F 7/104 |
|  |  |  |  |  | 188/268 |
| 8,406,112 | B2 |   | 3/2013 | Merrill et al. |  |
| 8,611,201 | B2 |   | 12/2013 | Desjardins |  |
| 2012/0008488 | A1 | * | 1/2012 | Merrill | G11B 3/61 |
|  |  |  |  |  | 369/266 |
| 2012/0250489 | A1 | * | 10/2012 | Desjardins | G11B 19/2018 |
|  |  |  |  |  | 369/263.1 |

FOREIGN PATENT DOCUMENTS

GB          1036561 A  *  7/1966  .............. G11B 3/14

* cited by examiner

*Primary Examiner* — William J Klimowicz
(74) *Attorney, Agent, or Firm* — Chen-Chi Lin

(57) ABSTRACT

A platter supported and driven turntable has a spindle, an upper circular platter, a lower circular platter, an arm board, and a tonearm assembly. The spindle is to rotate about a first direction. The spindle has a hub, a shaft and a bearing assembly between the hub and the shaft. The shaft has a flange. The upper circular platter is attached to the shaft of the spindle. The lower circular platter is attached to the flange of the shaft of the spindle. The arm board is attached to the hub of the spindle. The arm board has a first extension section, a mid-range section, and a second extension section. The mid-range section of the arm board is disposed between the upper circular platter and the lower circular platter. The tonearm assembly is directly attached to the first extension section of the arm board. The second extension section of the arm board is attached to a ballast or a supporting turntable through one or more adjustable height mounts.

30 Claims, 25 Drawing Sheets

PLATTER SUPPORTED AND DRIVEN TURNTABLE

CROSS-REFERENCE TO RELATED APPLICATIONS

This patent application claims benefit of a provisional patent application 62/529,118 having a Filing Date of Jul. 6, 2017. The disclosure made in the provisional patent application 62/529,118 is hereby incorporated by reference.

FIELD OF THE INVENTION

This invention relates generally to a turntable for playing a record. More particularly, the present invention relates to a platter supported and driven turntable configured to be mounted on a supporting turntable.

BACKGROUND OF THE INVENTION

Turntables are also called phonographs or record players. Turntables may be characterized into different types. Three most common types of conventional turntables include direct drive type turntable, idler drive type turntable and belt drive type turntable. In examples of the present disclosure, applicant's test results show that the present disclosure significantly improves sound quality of the direct drive type turntable; improves sound quality of the idler drive type turntable; and somewhat improves sound quality of the belt drive type turntable.

A direct drive type turntable usually has the greatest amount of instantaneous torque available to the platter (for very good transient response and low bass reproduction). However, one downside is that an increased motor noise level is coupled into the music. Some direct drive type turntable manufacturers use a very heavy body (also called a base or plinth) in an effort to reduce motor vibrations.

An idler drive type turntable is very similar to a rim drive type turntable. The idler drive type turntable uses elastomeric wheels to couple the motor to the platter. The idler drive type turntable uses elastomeric motor mount (for example, rubber). One downside is that it couples more motor noise into the music.

The belt drive type turntable uses an elastomeric belt that couples its driving motor to its platter while filtering out the motor's vibrations. This belt has a tendency to oscillate and to stretch slightly during loud musical passages which dulls the musical peaks. One solution of the belt drive type turntable is to use a heavy platter which acts as a flywheel. Low mass belt drive turntables suffer from speed instabilities due to needle drag during loud musical passages so as to dull musical transients. The belt drive type turntable usually mounts the motor on an elastic material or a viscoelastic material such as rubber. The elastic material has similar problem as the drive belt. Some belt drive turntable manufacturers mount the motor in an enclosure that is separated from the turntable body to reduce vibration and to take advantage of a stiffer mounting system. This type of solution requires a sturdy and rigid surface for them to rest on.

A conventional magnetic coupled platter turntable is expensive. It uses magnets to couple energy from one platter to another. It requires strong supporting pillars attached to arm boards to keep the platters from sticking to one another. The strong supporting pillars drain energies from the tonearm energy loop and degrade sound qualities.

U.S. Pat. No. 3,082,635 to Grado, U.S. Pat. No. 8,406,112 to Merrill et. al., and U.S. Pat. No. 8,611,201 to Desjardins describe unwanted energies of turntables affecting sound qualities. The energy of a motor of a conventional turntable propagates through at least part of a platter of the conventional turntable. The propagated energy causes vibration to be superimposed onto a record that is played by the conventional turntable. Vibrations induced by the motor of the conventional turntable propagate through a base of the conventional turntable. The propagated, motor induced vibrations introduce uncertainties to a relative location between a needle of the turntable and the record. It adds noise and distortion to a desired musical signal that the needle supposed to pick up. A quality conventional turntable reduces vibrations by introducing a heavy platter and a heavy base. However, a large mass of the heavy platter and a large mass of the heavy base store and release vibrational energies (analogous to an echo effect). The echo effect results in a heavy or dead sound signal.

A conventional turntable has the arm board mounted on a same plate that provides support for the platter. Therefore, the tonearm energy loop will be affected by the motor's energy loop through the motor's mounting system as well as through the platter itself. The tonearm energy loop includes a stylus, a tonearm assembly, an arm board, a bearing assembly, a shaft, a platter, a platter mat (if used) and a vinyl record.

One way to reduce a degradation of the musical signal or the sound signal is not to mount the record on the platter of the conventional turntable. Instead, the present disclosure, adds a platter supported and driven turntable between the record and the platter of the conventional turntable. The platter supported and driven turntable is structurally supported by the platter of the conventional turntable. The platter supported and driven turntable is driven by a rotation energy from the platter of the conventional turntable.

A mat of the platter of the conventional turntable may provide a vibration dampening effect to achieve a predetermined level of vibration isolation. The mat at a point of contact may act as a constrained layer dampening system.

In examples of the present disclosure, the rotational energy from the platter of the conventional turntable is transferred to a lower platter of the present disclosure through a spacer ring. The spacer ring may be disposed between the platter of the conventional turntable and the lower platter of the present disclosure. The spacer ring may be proximate to an outer portion of the platter of the conventional turntable. The rotational energy is then transferred to a shaft of a spindle of the present disclosure. An arm board (also called a tonearm board) and flanged sleeve bearing are attached to the shaft.

To use the platter supported and driven turntable of the present disclosure, a user sets the platter supported and driven turntable of the present disclosure atop the platter of the conventional turntable. The user may attach a new tonearm assembly or a tonearm assembly of the conventional turntable to one end of the arm board of the present disclosure. In one example, the other end of the arm board of the present disclosure may be affixed to a ballast (a heavy and non-vibration prone object). In another example, the other end of the arm board of the present disclosure may be affixed to the conventional turntable.

It is advantageous to place the platter supported and driven turntable of the present disclosure and the conventional turntable on a rigid surface so as to couple the two together. One advantage of the setup of the present disclosure is that records can be played with greater clarity. The propagation of vibration energy of the motor through a tonearm energy loop including a stylus, a tonearm assembly, an arm board, a bearing assembly, a shaft, a platter, a platter mat (if used) and a vinyl record is greatly suppressed. The present disclosure uses a very low mass tonearm energy loop.

In one example, the platter supported and driven turntable of the present disclosure retrofits to a conventional turntable. In another example, the platter supported and driven turntable of the present disclosure may be mounted on or built into a newly-built turntable.

It is advantage to facilitate a low mass tonearm energy loop that is not connected to the supporting elements of the turntable. This enables musical transients to rise and fall effortlessly. And it offers greater rejection of airborne vibrations.

A cantilever design enables the ballast to provide substantially more inertia against rotational energy compared to a conventional turntable because the ballast is further away from the axis of rotation of the spindle. A single ground path avoids ground loop effects. The lower circular platter may have a damping material affixed to it. In one example, the lower circular platter may couple with the platter of a conventional turntable through spikes, small disks, or small balls. In another example, the lower circular platter may directly contact with the platter of the conventional turntable. In one example, the spacer ring is a continuous ring. In another example, the spacer ring comprises a plurality of segments.

In examples of the present disclosure, the lower circular platter may directly contact with the platter of the conventional turntable. The lower circular platter, the mat of the platter of the conventional turntable and the platter of the conventional turntable may form a constrained layer dampening system (which dissipates vibrations as heat). This constrained layer dampening system is easily tunable by using different mat materials with different thickness. The constrained layer dampening system in this application may also function somewhat like a bullet proof vest or a bullet proof glass. The energy is dissipated across the material instead of through it.

An outer profile of the arm board may have different shapes including a boomerang shape and a letter "S" shape.

In examples of the present disclosure, the conventional turntable may provide three or more points of support to the platter supported and driven turntable of the present disclosure. In examples of the present disclosure, three or more rigid and dampened feet may be used to support the arm board. It allows an option of enclosing the existing turntable for cosmetic purposes. Not all conventional models of turntables will be suitable for use with the present disclosure. Some conventional models do not have enough power to drive the platter supported and driven turntable of the present disclosure steadily or up to a proper speed. Some conventional models do not provide stable support to the platter supported and driven turntable of the present disclosure.

SUMMARY OF THE INVENTION

A platter supported and driven turntable has a spindle, an upper circular platter, a lower circular platter, an arm board, and a tonearm assembly. The spindle is to rotate about a first direction. The spindle has a hub, a shaft and a bearing assembly between the hub and the shaft. The shaft has a flange. The upper circular platter is attached to the shaft of the spindle. The lower circular platter is attached to the flange of the shaft of the spindle. The arm board is attached to the hub of the spindle. The arm board has a first extension section, a mid-range section, and a second extension section. The mid-range section of the arm board is disposed between the upper circular platter and the lower circular platter. The tonearm assembly is directly attached to the first extension section of the arm board. The second extension section of the arm board is attached to a ballast or a supporting turntable through one or more adjustable height mounts.

DETAILED DESCRIPTION OF THE INVENTION

Figure 1:
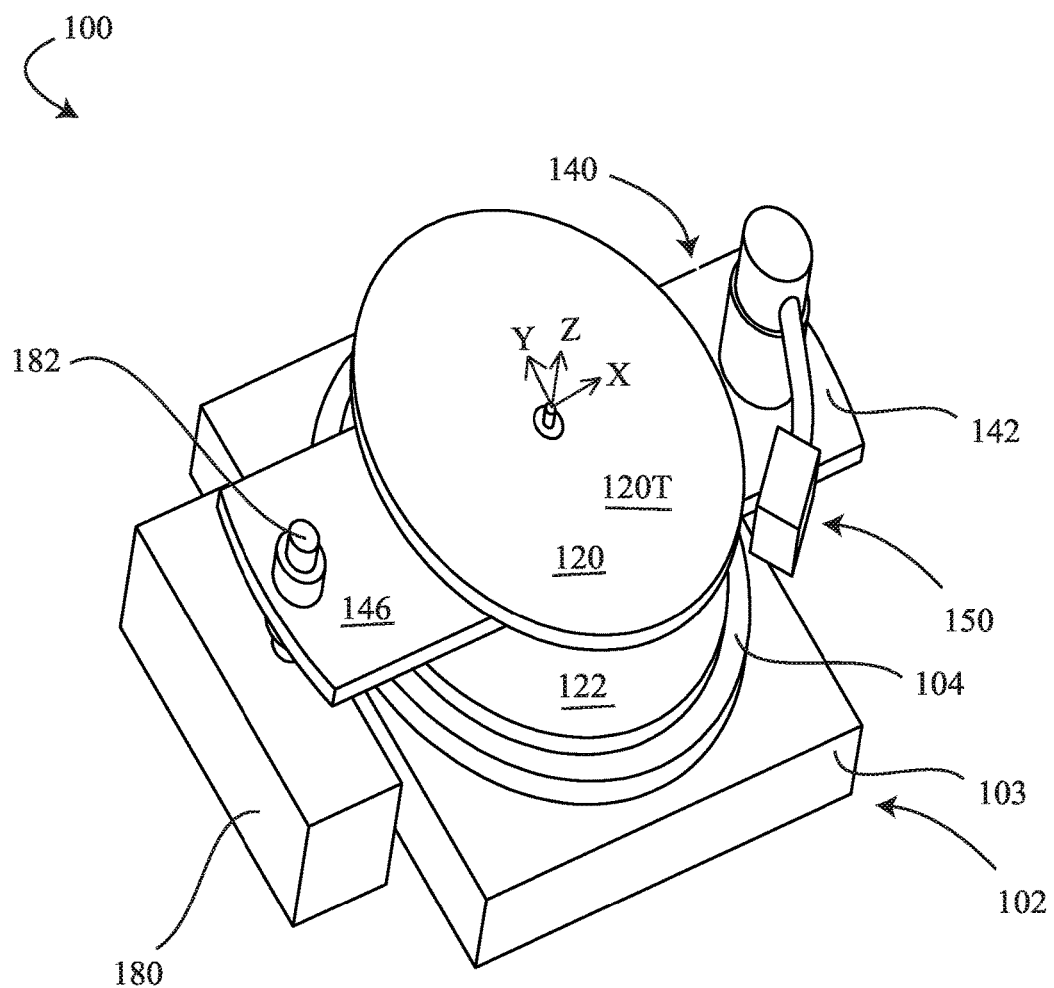
FIG. 1 is a perspective view of a platter supported and driven turntable mounted on a supporting turntable in examples of the present disclosure.
Figure 2:
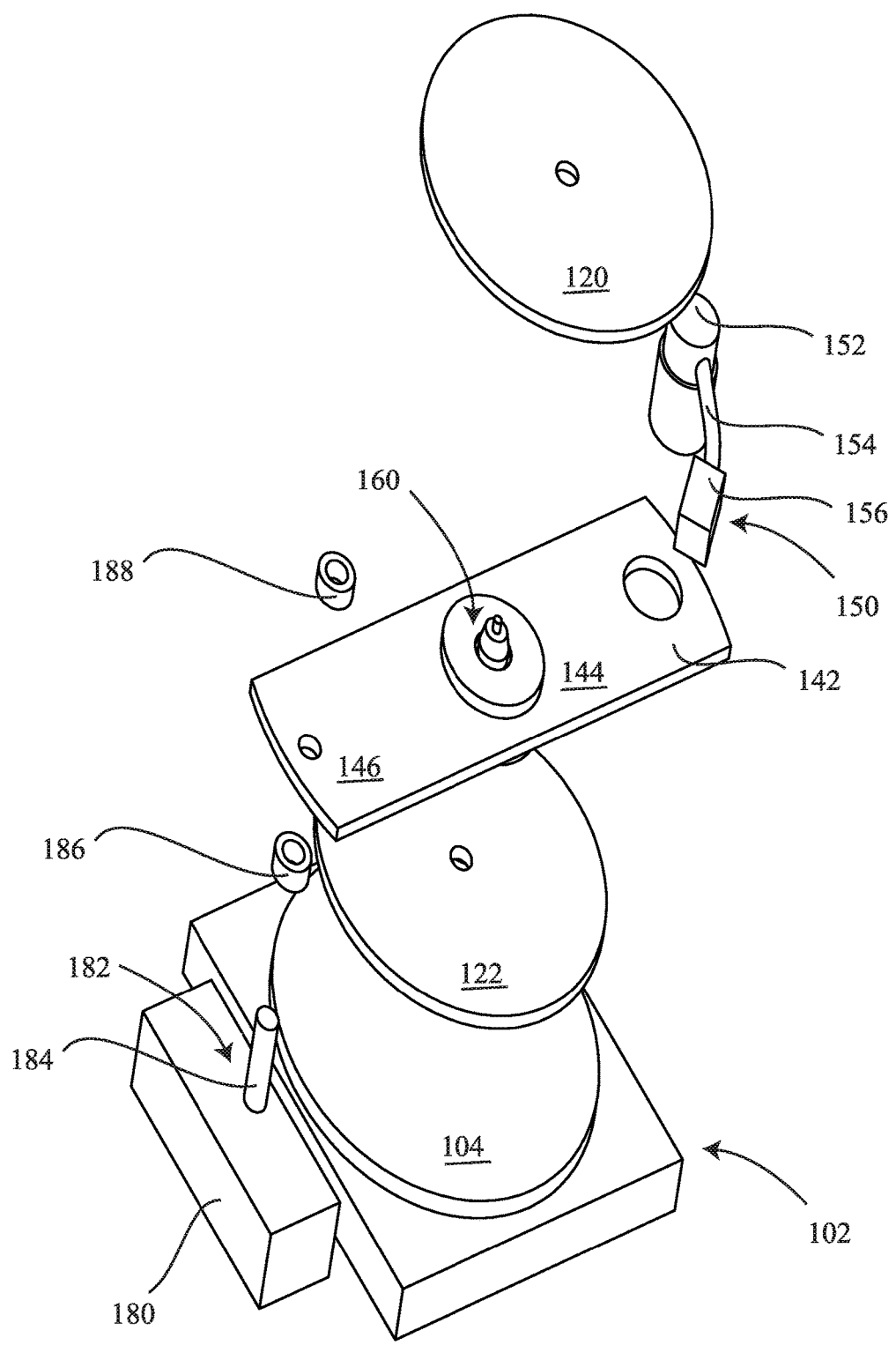
FIG. 2 is an exploded view of the platter supported and driven turntable and the supporting turntable of FIG. 1 in examples of the present disclosure.
Figure 4:
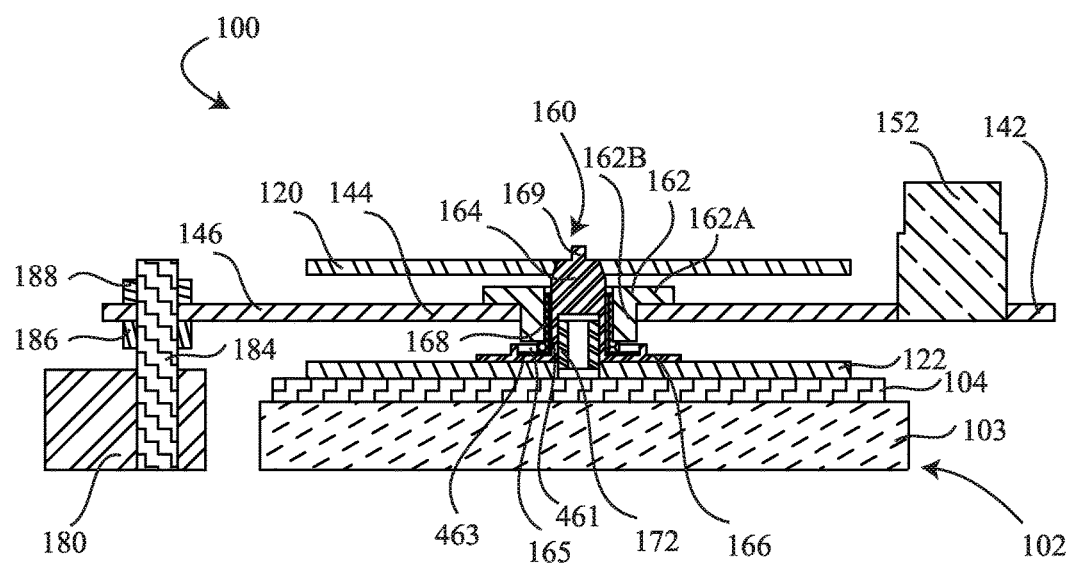
FIG. 4 is a cross-sectional view of the platter supported and driven turntable and the supporting turntable of FIG. 1 in examples of the present disclosure.

FIG. 1 is a perspective view of a platter supported and driven turntable 100 mounted on a supporting turntable 102 in examples of the present disclosure. FIG. 2 is an exploded view (exploded along Z-direction of FIG. 1) of the platter supported and driven turntable 100 and the supporting turntable 102 of FIG. 1 in examples of the present disclosure. FIG. 4 is a cross-sectional view (viewing a cross-section at XZ plane from a negative Y location of FIG. 1) of the platter supported and driven turntable 100 and the supporting turntable 102 of FIG. 1 in examples of the present disclosure. In one example, the supporting turntable 102 is an Audio-Technica AT-LP120-USB Direct-Drive turntable. In another example, the supporting turntable 102 is an Audio-Technica AT-LP3BK Fully Automatic Belt-Drive Stereo Turntable.

Referring now to FIGS. 1, 2 and 4, the platter supported and driven turntable 100 has a spindle 160, an upper circular platter 120, a lower circular platter 122 (also called a lower circular base plate), an arm board 140, and a tonearm assembly 150. The spindle 160 is to rotate about a first direction (Z-direction). The spindle 160 has a hub 162, a shaft 164 and a bearing assembly 168 between the hub 162 and the shaft 164. In examples of the present disclosure, the bearing assembly 168 includes flanged sleeve bearings. In examples of the present disclosure, the bearing assembly 168 includes a self aligning bearing, a magnetic supported or levitated bearing, a sleeve bearing with a thrust washer bearing, or a roller bearing. The shaft 164 has a flange 166. The upper circular platter 120 is attached to the shaft 164 of the spindle 160. The lower circular platter 122 is attached to the flange 166 of the shaft 164 of the spindle 160.

Figure 5:
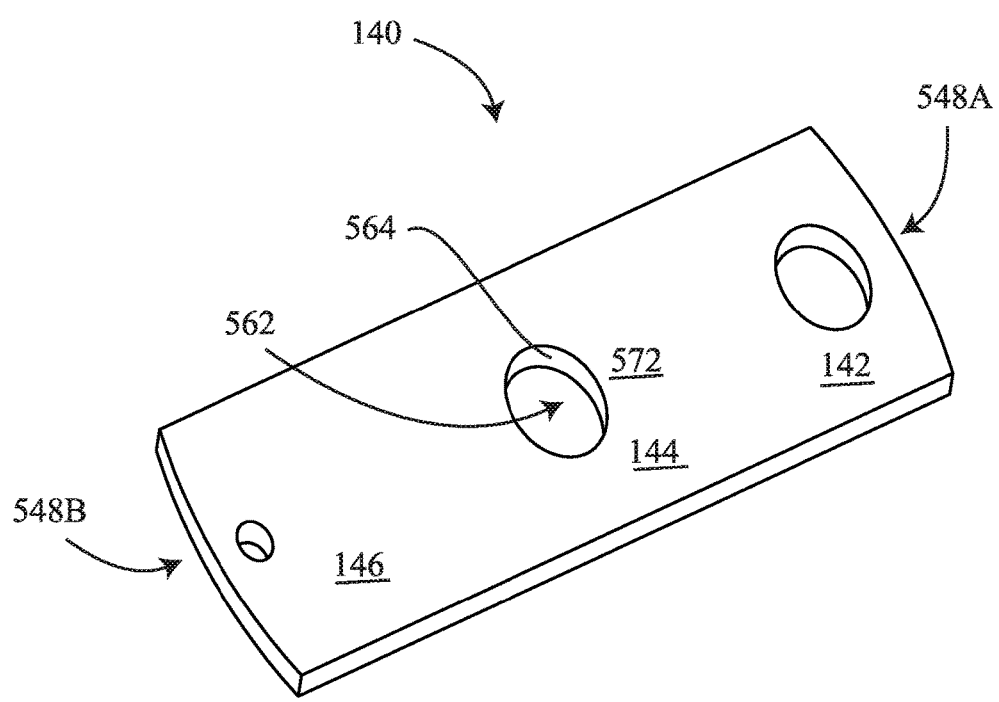
FIG. 5 is a perspective view of the arm board of FIG. 1 in examples of the present disclosure.

FIG. 5 is a perspective view of the arm board 140 of FIG. 1 in examples of the present disclosure. Referring now to FIGS. 1, 2, 4 and 5, the arm board 140 is attached to the hub 162 of the spindle 160. In examples of the present disclosure, the hub 162 has an upper portion 162A and a lower portion 162B. A hole surface 564 of FIG. 5 of a hole 562 of the arm board 140 of FIG. 5 directly contacts an outer surface of the lower portion 162B of the hub 162. An upper surface 572 of the arm board 140 of FIG. 5 adjacent to the hole 562 directly contacts a lower surface of the upper portion 162A of the hub 162. The arm board 140 has a first extension section 142, a mid-range section 144, and a second extension section 146. The first extension section 142 extends from the mid-range section 144. The second extension section 146 extends from the mid-range section 144. The second extension section 146 extending along negative X-direction is on an opposite side of the first extension section 142 extending along positive X-direction. The mid-range section 144 of the arm board 140 is disposed between the upper circular platter 120 and the lower circular platter 122.

In examples of the present disclosure, arm board 140 is made of a rigid material including Baltic Birch plywood, MDF plywood, aluminum, magnesium, Torlon and Delrin. In examples of the present disclosure, arm board 140 is made of one or more materials selected from the group consisting of Baltic Birch plywood, MDF plywood, aluminum, magnesium, Torlon, and Delrin. In examples of the present disclosure, damping materials are applied to a top surface or a bottom surface of the arm board 140. In examples of the present disclosure, damping materials are applied to both the top surface and the bottom surface of the arm board 140.

Referring now to FIGS. 1, 2 and 4, the tonearm assembly 150 is directly attached to the first extension section 142 of the arm board 140. The tonearm assembly 150 has a pivot 152, a phono arm 154, and a head assembly 156. In examples of the present disclosure, the tonearm assembly 150 is connected to a power source.

Figure 15:
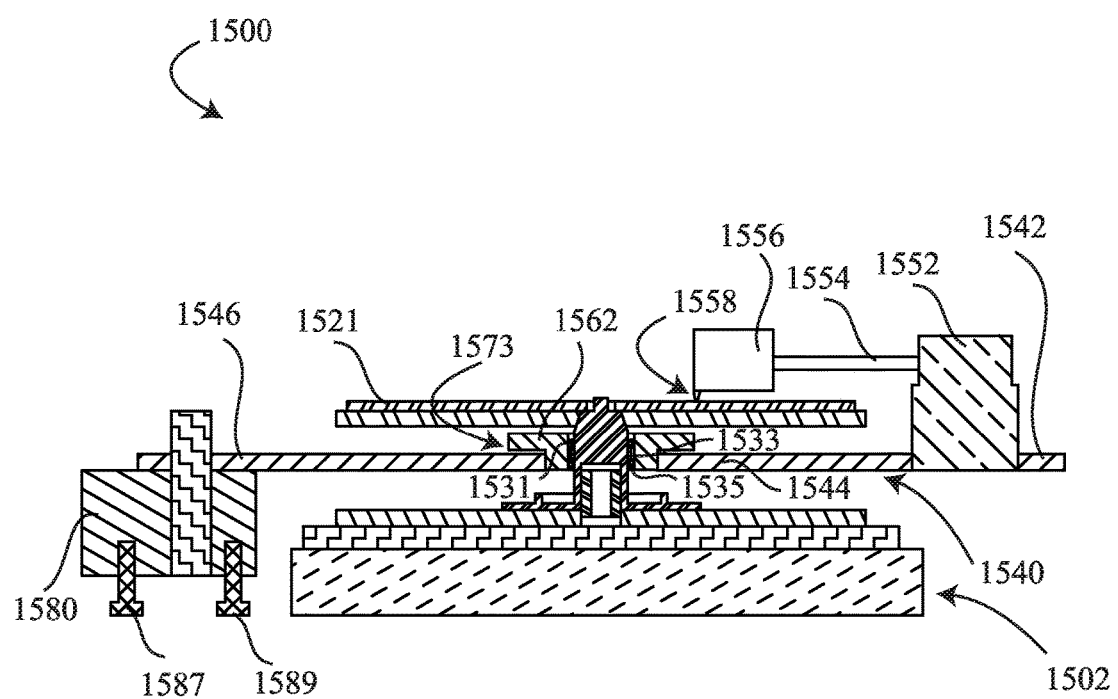
FIG. 15 is a cross-sectional view of a platter supported and driven turntable having a ballast with adjustable height legs and a corresponding supporting turntable in examples of the present disclosure.

In examples of the present disclosure, the second extension section 146 of the arm board 140 is attached to a ballast 180 through an adjustable height mount 182. In examples of the present disclosure, the arm board is stationary and will not rotates about Z-direction. The adjustable height mount 182 includes a post 184, a lower fastener 186 and an upper fastener 188. The second extension section 146 of the arm board 140 is secured between the lower fastener 186 and the upper fastener 188. In one example, a pressure between a needle 1558 of FIG. 15 and a record 1521 of FIG. 15 is adjusted by changing heights of the lower fastener 186 and the upper fastener 188 of the adjustable height mount 182. In another example, the adjustable height mount 182 may be tuned to reduce noise and friction of the bearing assembly 168. In examples of the present disclosure, the ballast 180 is made of an anvil material, a concrete block, a rock, a brick or a metal sheet with a constrained layer damper.

The platter supported and driven turntable 100 is configured to be placed on the supporting turntable 102. A top surface 120T of the upper circular platter 120 is configured to be placed under a record (for one example, the record 1521 of FIG. 15). The supporting turntable 102 has a base 103 and a supporting platter 104. In examples of the present disclosure, the supporting turntable 102 drives the supporting platter 104. The supporting platter 104 drives the lower circular platter 122 of the platter supported and driven turntable 100. The lower circular platter 122 drives the shaft 164 of the spindle 160. The shaft 164 drives the upper circular platter 120. The upper circular platter 120 drives the record 1521 of FIG. 15.

In examples of the present disclosure, a method includes the steps of: placing the platter supported and driven turntable 100 on the supporting turntable 102; and placing the top surface 120T of the upper circular platter 120 under the record 1521 of FIG. 15.

In examples of the present disclosure, the lower circular platter 122 is made of an aluminum material. The lower circular platter 122 has␣an 11-inch outer diameter. The lower circular platter 122 is of a ⅛-inch thickness. The lower circular platter 122 has a ½-inch hole at a center of the lower circular platter 122.

In examples of the present disclosure, the lower circular platter 122 is attached to the flange 166 of the shaft 164 by screws. The shaft has a ¾-inch diameter. The flange 166 has a 2.5-inch diameter. A ¾-inch recess is at a lower side (the flanged side) of the shaft. The ¾-inch recess has a diameter of ½-inch. The ¾-inch recess is to receive a viscoelastic cylinder 172. In examples of the present example, the viscoelastic cylinder 172 has a ½-inch outer diameter, has a 0.283-inch inner diameter and is ⅞-inch long. The viscoelastic cylinder 172 may suppress vibration and may serve as a centering device (for alignment with a record locating sub-spindle 1392 of FIG. 13).

In examples of the present disclosure, the shaft 164 of the spindle 160 has a reservoir 165 to receive lubricants. The reservoir 165 is above the flange 166 of the shaft 164 of the spindle 160.

In examples of the present disclosure, an upper side of the shaft 164 of the spindle 160 is of a tapered shape. The tapered shape of the upper side of the shaft 164 of the spindle 160 allows it to snugly accommodate the upper circular platter 120. The upper circular platter 120 has a tapered hole (or a conical hole). A top record locating sub-spindle 169 of the shaft 164 has a 0.285-inch diameter. The top record locating sub-spindle 169 is 0.6-inch lone. The top record locating sub-spindle 169 is to penetrate a hole of the record 1521 of FIG. 15.

In examples of the present disclosure, the bearing assembly 168 is made of Teflon, Torlon, Rulon, Delrin, a self-lubricated bushing, a slippery plastic or Nylon. In examples of the present disclosure, the hub (the housing of the bearing assembly 168) and a mount of the arm board 140 has a one-inch long OILITE (a brand name for oil impregnated sintered bronze). The bearing assembly 168 fits inside the one-inch long OILITE. In examples of the present disclosure, the bearing assembly 168 has an outer diameter of 1.003-inch and an inner diameter of 0.751-inch. In examples of the present disclosure, damping materials are applied to an inner surface or an outer surface of the bearing assembly 168. In examples of the present disclosure, damping materials are applied to the inner surface and the outer surface of the bearing assembly 168. In examples of the present disclosure, the bearing assembly 168 may include a ground wire.

In examples of the present disclosure, the housing of the bearing assembly 168 has a 2.5-inch diameter flange and a 1.002-inch inner diameter. It attaches to the arm board 140. In examples of the present disclosure, the arm board 140 is of ½-inch thick and is made of a Baltic birch plywood material. In examples of the present disclosure, the bearing assembly 168 of FIG. 4 of the platter supported and driven turntable 100 is of a fluid dynamic bearing type. The bearing assembly 168 comprises a bushing 168A, a first layer of oil 461 and a second layer of oil 463. A reservoir 165 is located above a flange 166 of the shaft 164 of the spindle 160. The first layer of oil 461 directly contacts an inner surface of the bushing 168A and an outer surface of the shaft 164 of the spindle 160. The second layer of oil 463 directly contacts a bottom surface of the bushing 168A and a top surface of the flange 166 of the shaft 164 of the spindle 160.

Figure 3:
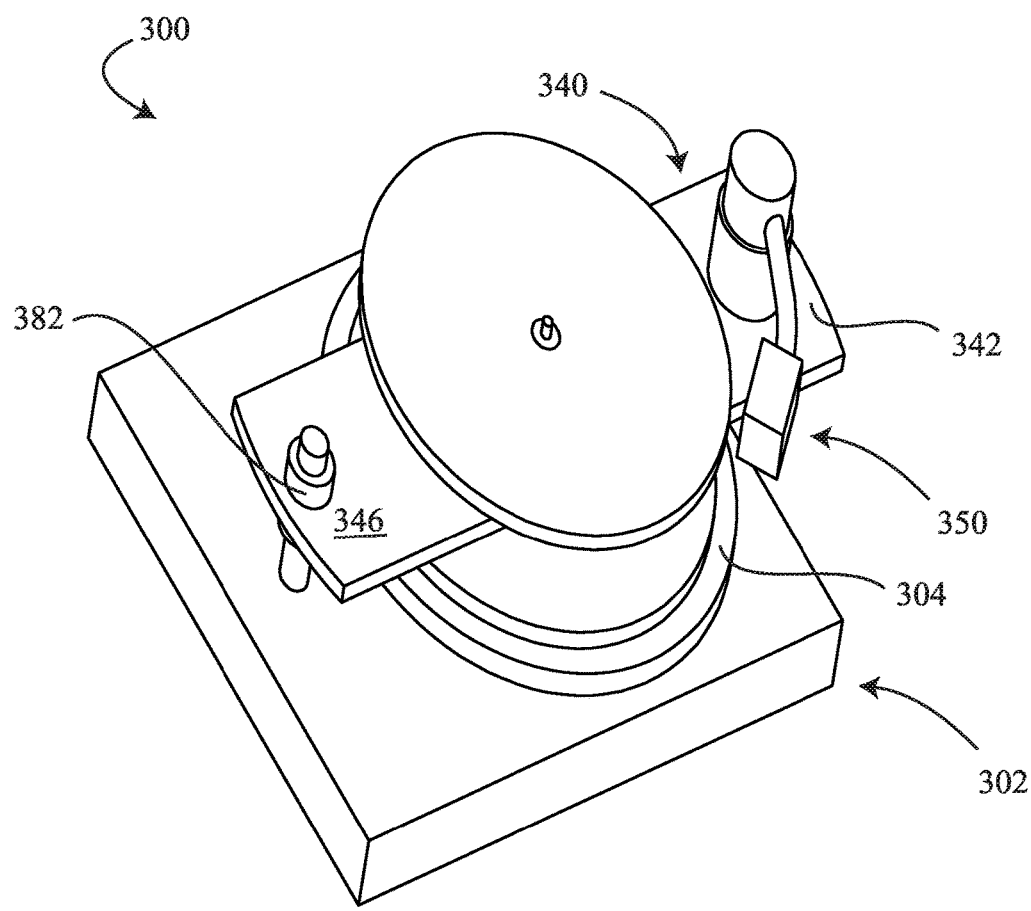
FIG. 3 is a perspective view of another platter supported and driven turntable mounted on another supporting turntable in examples of the present disclosure.

FIG. 3 is a perspective view of a platter supported and driven turntable 300 mounted on a supporting platter 304 of a supporting turntable 302 in examples of the present disclosure. The arm board 340 has a first extension section 342 and a second extension section 346. A tonearm assembly 350 is directly attached to the first extension section 342 of the arm board 340. The second extension section 346 of the arm board 340 of the platter supported and driven turntable 300 is attached to the supporting turntable 302 through one or more adjustable height mounts 382.

In FIG. 3, the advantage to attach the second extension section 346 of the arm board 340 of the platter supported and driven turntable 300 to the supporting turntable 302 is to save space. In FIG. 1, the advantage to attach the second extension section 146 of the arm board 140 of the platter supported and driven turntable 100 to the ballast 180 is to achieve better sound quality.

Figure 6:
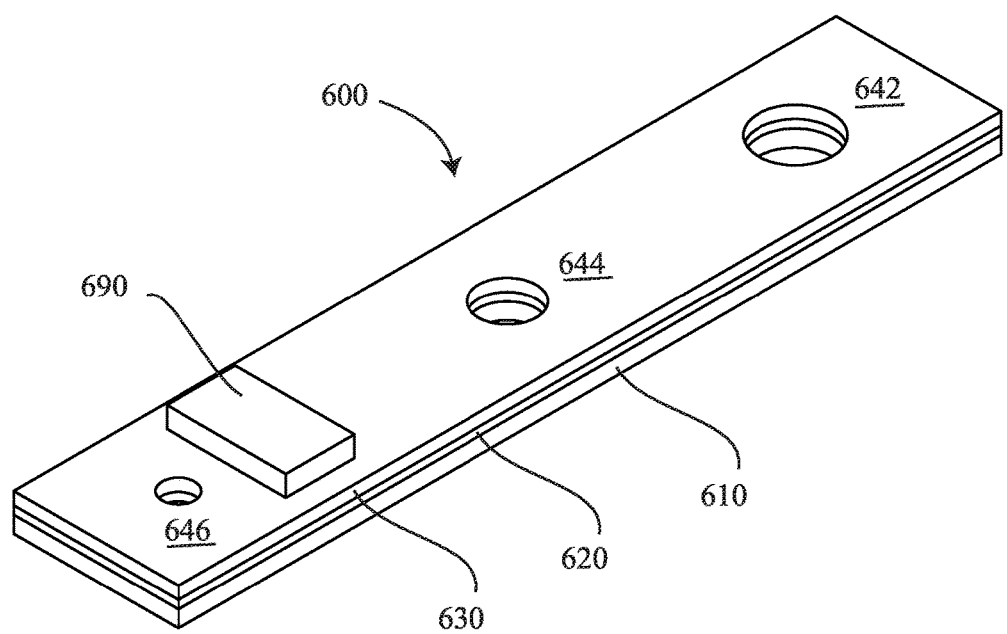
FIG. 6 is a perspective view of another arm board in examples of the present disclosure.

FIGS. 6-10 show variations of the arm board 140 of FIG. 1. FIG. 6 is a perspective view of an arm board 600 in examples of the present disclosure. A top surface of the arm board 600 is of a rectangular shape. The arm board 600 has a first layer 610, a second layer 620 and a third layer 630. In one example, the first layer 610 is made of a metal material, the second layer 620 is made of a wood material, and the third layer 630 is made of a metal material. In another example, the first layer 610 is made of a metal material, the second layer 620 is made of a viscoelastic material, and the third layer 630 is made of a metal material. In still another example, the first layer 610 is made of a metal material, the second layer 620 is made of an acrylic material, and the third layer 630 is made of a metal material. In yet another example, the first layer 610 is made of an acrylic material, the second layer 620 is made of a metal material, and the third layer 630 is made of an acrylic material. The arm board 600 has a first extension section 642, a mid-range section 644, and a second extension section 646. A balancing weight 690 is directly attached to the second extension section 646 of the arm board 600. In one example, a pressure between a needle 1558 of FIG. 15 and a record 1521 of FIG. 15 is adjusted by changing a weight of the balancing weight 690.

Figure 7:
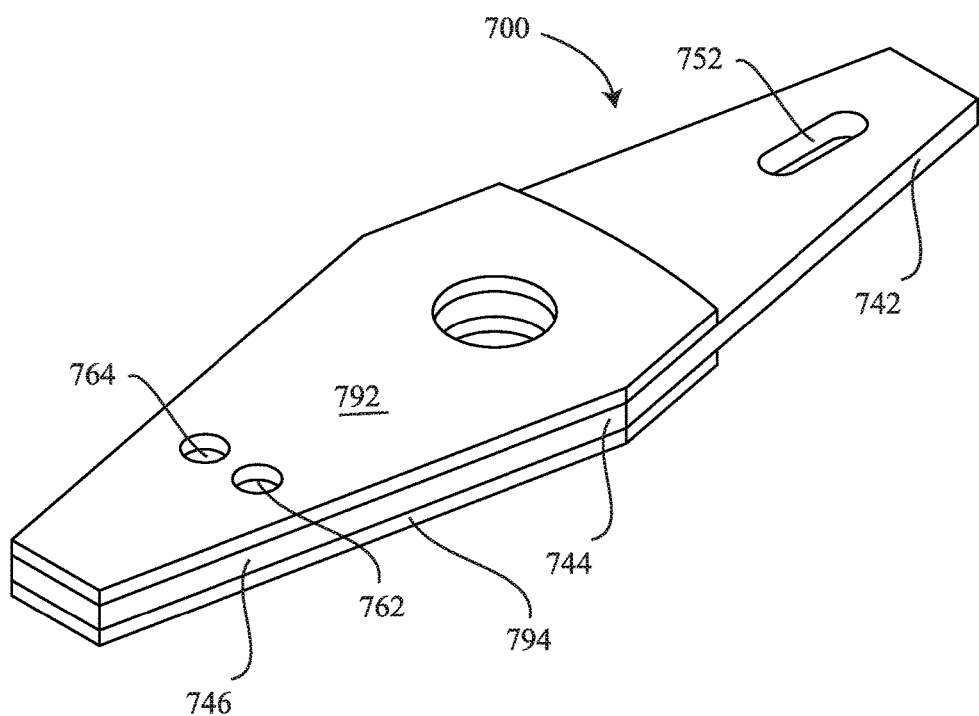
FIG. 7 is a perspective view of still another arm board in examples of the present disclosure.

FIG. 7 is a perspective view of an arm board 700 in examples of the present disclosure. The arm board 700 has a first extension section 742, a mid-range section 744, and a second extension section 746. A first balancing weight 792 is directly attached to a top surface of the second extension section 746 and a top surface of the mid-range section 744 of the arm board 700. A second balancing weight 794 is directly attached to a bottom surface of the second extension section 746 and a bottom surface of the mid-range section 744 of the arm board 700. The first balancing weight 792 and the second balancing weight 794 may serve as stiffeners to stiffen the arm board 700. The arm board 700 has an elongated hole 752 in the first extension section 742 to receive a SME type tonearm. The arm board 700 has two holes 762 and 764 in the second extension section 746 to receive two adjustable height mounts. The mid-range section 744 is wider than the first extension section 742. The mid-range section 744 is wider than the second extension section 746. Therefore, the resistance to a torsional force along a longitudinal direction of the arm board 700 is increased.

Figure 8:
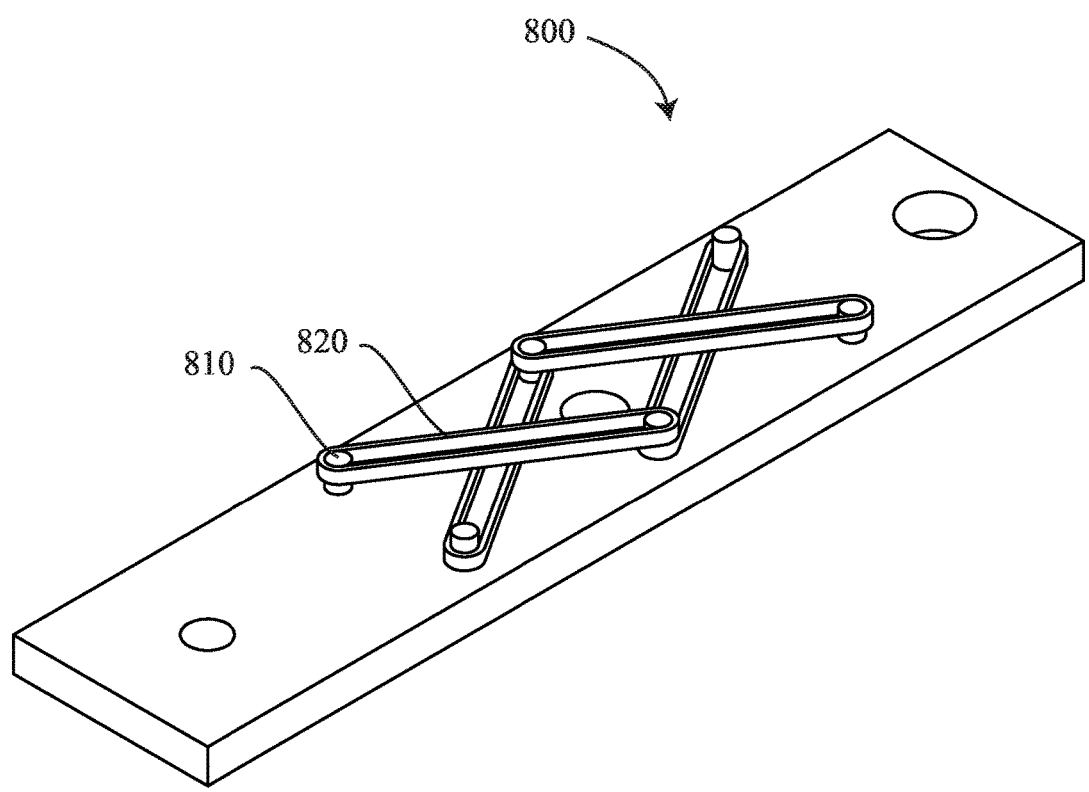
FIG. 8 is a perspective view of yet another arm board in examples of the present disclosure.

FIG. 8 is a perspective view of an arm board 800 in examples of the present disclosure. A plurality of pins 810 are directly mounted on the arm board 800. A plurality of tensile straps 820 span over the plurality of pins 810. The plurality of tensile straps 820 stiffen the arm board 800.

Figure 9:
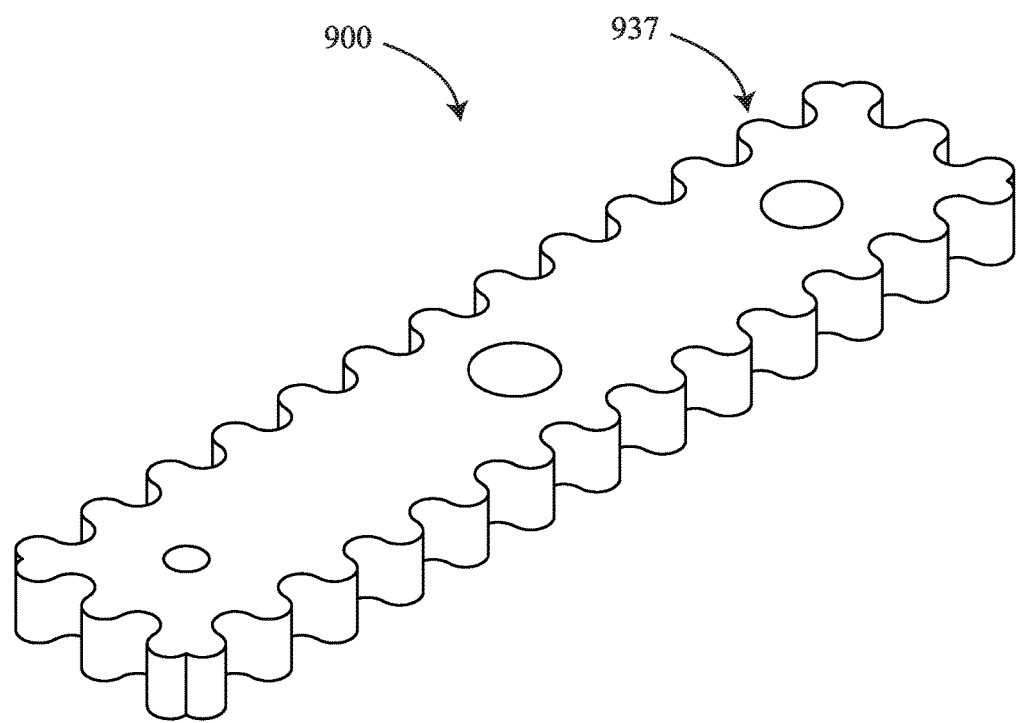
FIG. 9 is a perspective view of yet still another arm board in examples of the present disclosure.

FIG. 9 is a perspective view of an arm board 900 in examples of the present disclosure. An outer profile 937 of the arm board 900 is of a wavy shape or a saw-teeth shape. The wavy shape or the saw-teeth shape of the outer profile 937 dissipates energy of a wave when the wave hits the outer profile 937.

Figure 10:
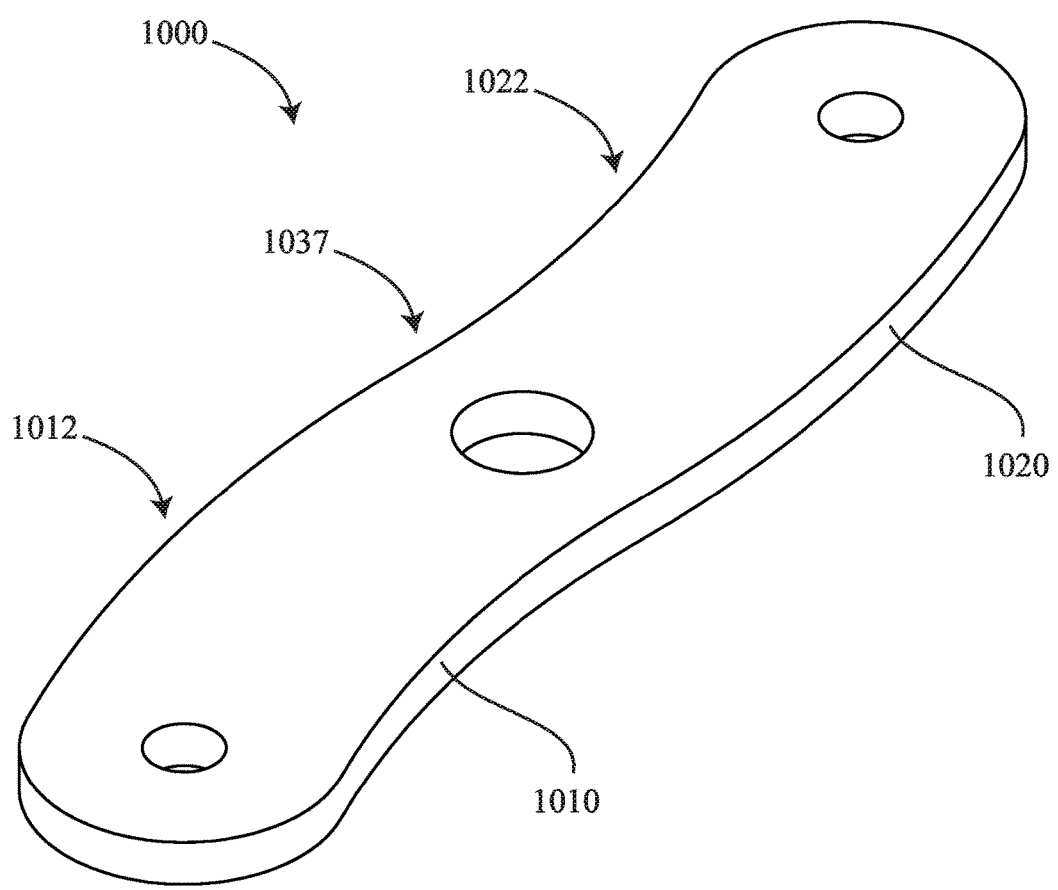
FIG. 10 is a perspective view of an arm board having a wavy external profile in examples of the present disclosure.

FIG. 10 is a perspective view of an arm board 1000 in examples of the present disclosure. An outer profile 1037 of the arm board 1000 is of a boomerang shape, a letter "S"

shape or a wavy shape. The boomerang shape, the letter "S" shape or the wavy shape of the outer profile 1037 dissipates energy of a wave when the wave hits the outer profile 1037. Curvature 1010 and curvature 1020 are adjacent to each other and are along a side edge of the outer profile 1037. Curvature 1012 and curvature 1022 are adjacent to each other and are along another side edge of the outer profile 1037. Curvature 1010 and curvature 1012 have a same center of the curvature. Curvature 1020 and curvature 1022 have a same center of the curvature. A radius of curvature for curvature 1010 is smaller than a radius of curvature for curvature 1012. A radius of curvature for curvature 1020 is larger than a radius of curvature for curvature 1022. The outer profile 1037 of the arm board 1000 forms a rotational symmetry of order 2 about the Z-direction of FIG. 1.

Figure 11:
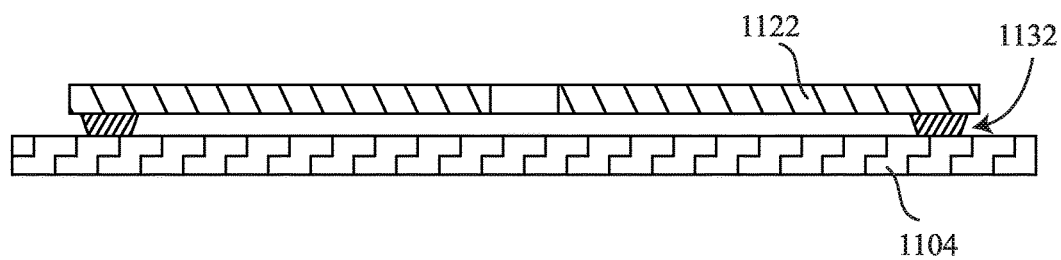
FIG. 11 is a partial, cross-sectional view of still another platter supported and driven turntable and still another supporting turntable in examples of the present disclosure.

FIGS. 11-15 show variations of the platter supported and driven turntable 100 and the supporting turntable 102 of FIG. 1. FIG. 11 is a partial, cross-sectional view of still another platter supported and driven turntable and still another supporting turntable in examples of the present disclosure. A spacer ring 1132 is between a lower circular platter 1122 and a supporting platter 1104. A cross-section of the spacer ring 1132 is of a trapezoidal shape. An upper side of the trapezoidal shape is longer than the lower side of the trapezoidal shape.

Figure 12:
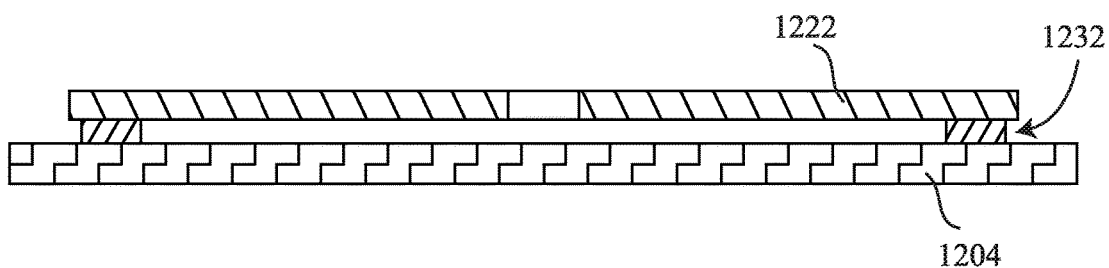
FIG. 12 is a partial, cross-sectional view of yet another platter supported and driven turntable and yet another supporting turntable in examples of the present disclosure.

FIG. 12 is a partial, cross-sectional view of yet another platter supported and driven turntable and yet another supporting turntable in examples of the present disclosure. A spacer ring 1232 is between a lower circular platter 1222 and a supporting platter 1204. A cross-section of the spacer ring 1232 is of a rectangular shape.

Figure 13:
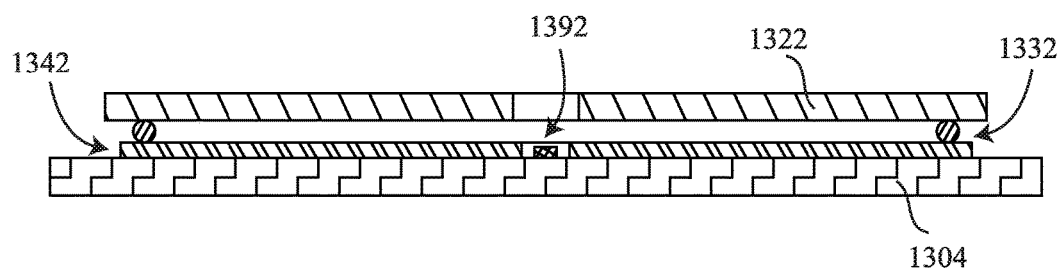
FIG. 13 is a partial, cross-sectional view of yet still another platter supported and driven turntable and yet still another supporting turntable in examples of the present disclosure.

FIG. 13 is a partial, cross-sectional view of yet still another platter supported and driven turntable and yet still another supporting turntable in examples of the present disclosure. A spacer ring 1332 is directly attached to a lower circular platter 1322. A damping layer 1342 is between the spacer ring 1332 and a supporting platter 1304. A cross-section of the spacer ring 1332 is of a circular shape. In examples of the present disclosure, the damping layer 1342 is viscoelastic material or an EAR ISO damping material. A record locating sub-spindle 1392 extended away from the supporting platter 1304 is located within a center hole (for example, 0.283-inch diameter center hole) of the damping layer 1342 (for example, 11-inch outer diameter). The damping layer 1342 helps to center and align the lower circular platter 1322.

Figure 14:
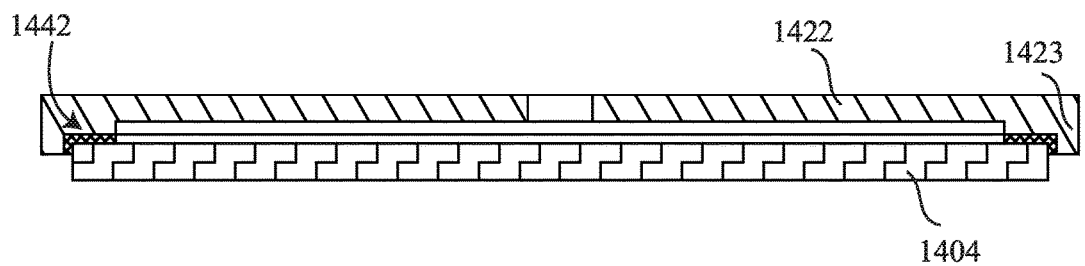
FIG. 14 is a partial, cross-sectional view of a platter supported and driven turntable having a lower circular platter with a flange and a corresponding supporting turntable in examples of the present disclosure.

FIG. 14 is a partial, cross-sectional view of a platter supported and driven turntable having a lower circular platter 1422 with a flange 1423 and a corresponding supporting turntable in examples of the present disclosure. The lower circular platter 1422 comprises a flange 1423 extending away from a bottom surface of the lower circular platter. A cross section of the flange 1423 of the lower circular platter 1422 is of a letter L shape. A damping material 1442 is attached to two sides of the flange 1423 of the lower circular platter 1422. The damping material is configured to directly contact a top surface and a side surface of a platter 1404 of the corresponding supporting turntable.

FIG. 15 is a cross-sectional view of a platter supported and driven turntable 1500 having a ballast 1580 with adjustable height legs 1587 and 1589 and a corresponding supporting turntable 1502 in examples of the present disclosure. The arm board 1540 has a first extension section 1542, a mid-range section 1544, and a second extension section 1546. The second extension section 1546 is directly attached to the ballast 1580. A tonearm assembly is directly attached to the first extension section 1542 of the arm board 1540.

The tonearm assembly has a pivot 1552, a phono arm 1554, and a head assembly 1556. The head assembly 1556 includes a needle 1558. The needle 1558 is configured to contact a record 1521 mounted on the platter supported and driven turntable 1500. A gap 1573 is between an upper surface of the arm board 1540 and a lower surface of a flange of a hub 1562. In examples of the present disclosure, the bearing assembly of the platter supported and driven turntable 1500 comprises an upper ball bearing 1531, a spacer 1533 and a lower ball bearing 1535. The spacer 1533 is between the upper ball bearing 1531 and the lower ball bearing 1535 along a rotation axis of the record 1521.

Figure 16:
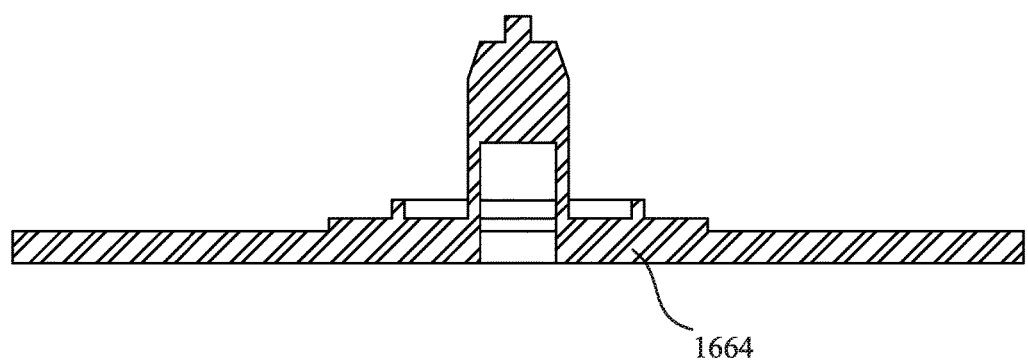
FIG. 16 is a cross-sectional view of a single-piece constructed shaft and lower circular platter in examples of the present disclosure.

FIG. 16 is a cross-sectional view of a single-piece constructed shaft and lower circular platter 1664 in examples of the present disclosure. The shaft 164 and the lower circular platter 122 of FIG. 4 are a two-piece construction. In one example, the single-piece constructed shaft and lower circular platter 1664 is made by a casting process.

Figure 17:
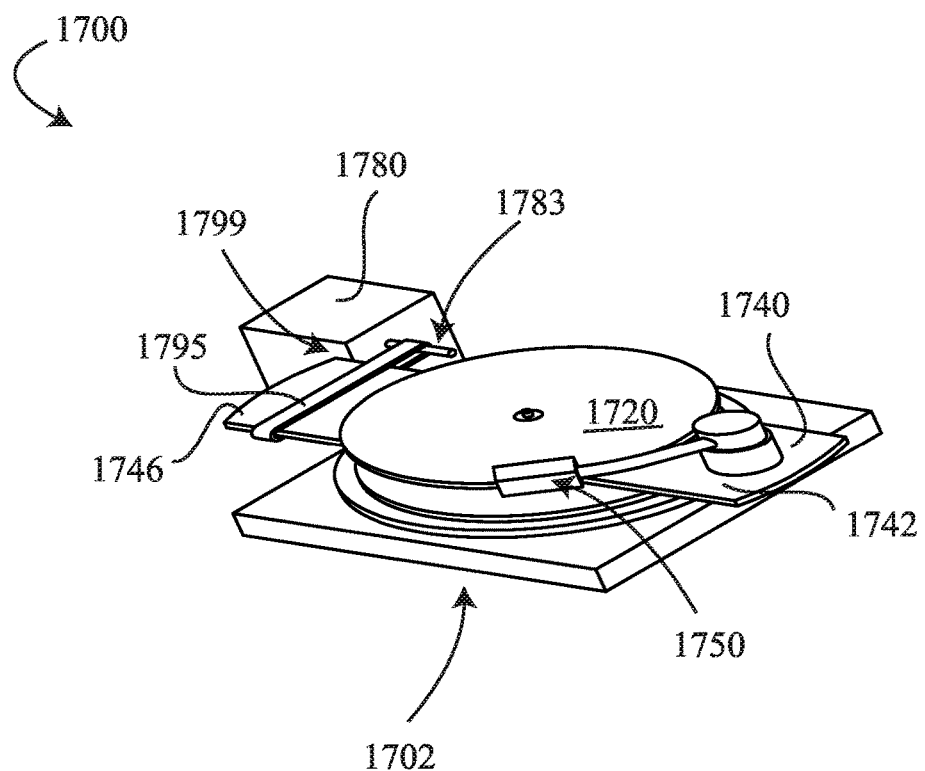
FIG. 17 is a perspective view of still another platter supported and driven turntable mounted on a supporting turntable in examples of the present disclosure.

FIG. 17 is a perspective view of still another platter supported and driven turntable 1700 mounted on a supporting turntable 1702 in examples of the present disclosure. An upper circular platter 1720 is configured to receive a record. An arm board 1740 has a first extension section 1742 and a second extension section 1746. In one example, the arm board 1740 has a plurality of holes to reduce mass. A tonearm assembly 1750 is mounted on the first extension section 1742 of the arm board 1740. A ballast 1780 has an extended pin 1783. An elastic band 1795 connects the second extension section 1746 of the arm board 1740 to the ballast 1780. A first end of the elastic band 1795 is directly attached to the second extension section 1746 of the arm board 1740. A second end of the elastic band 1795 is directly attached to the ballast 1780. The upper circular platter 1720 rotates clockwise. The second extension section 1746 of the arm board 1740 directly contacts the ballast 1780 at a location 1799 during operation.

Figure 18:
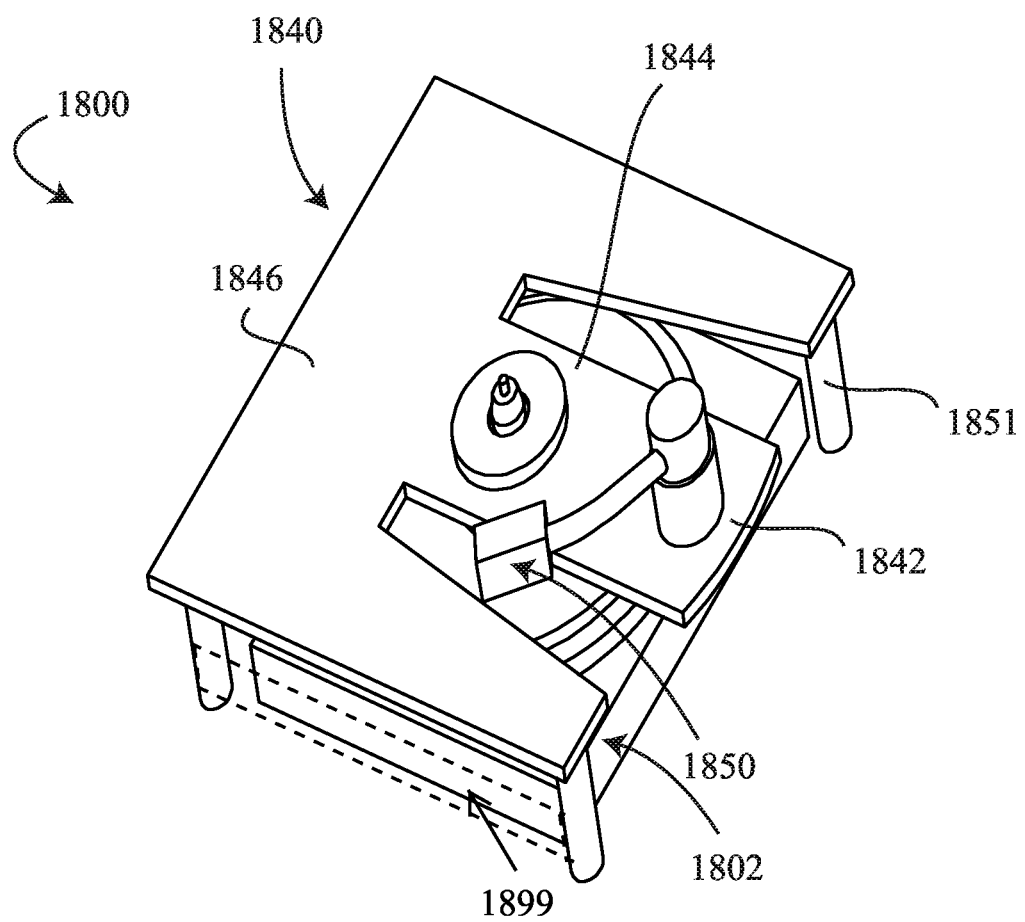
FIG. 18 is a perspective view of yet another platter supported and driven turntable mounted on a supporting turntable in examples of the present disclosure.

FIG. 18 is a perspective view of yet another platter supported and driven turntable 1800 mounted on a supporting turntable 1802 in examples of the present disclosure. An upper circular platter 1720 is not shown in FIG. 18. An arm board 1840 has a first extension section 1842, a mid-range section 1844 and a second extension section 1846. The mid-range section 1844 of the arm board 1840 is disposed between the upper circular platter 1720 and the lower circular platter. A tonearm assembly 1850 is mounted on the first extension section 1842 of the arm board 1840. Three or more legs 1851 extend away from the arm board 1840. A bottom surface of the lower circular platter is directly attached to a top surface of a supporting platter of the supporting turntable 1802. A length of the three or more legs 1851 is longer than a height of the supporting turntable 1802. A plurality of panels 1899 (optional panels shown in dashed lines) are attached to the three or more legs 1851. In one example, the plurality of panels 1899 are transparent. In another example, the plurality of panels 1899 are opaque. In examples of the present disclosure, a number of legs equals a number of panels. In examples of the present disclosure, a respective panel of the plurality of panels 1899 is directly attached to each adjacent pair of legs of the three or more legs 1851. In one example, there are four legs and four panels. In examples of the present disclosure, a number of legs is more than a number of panels. In one example, there are four legs and one panel. In another example, there are four legs and two panels. In still another example, there are four legs and three panels.

Figure 19:
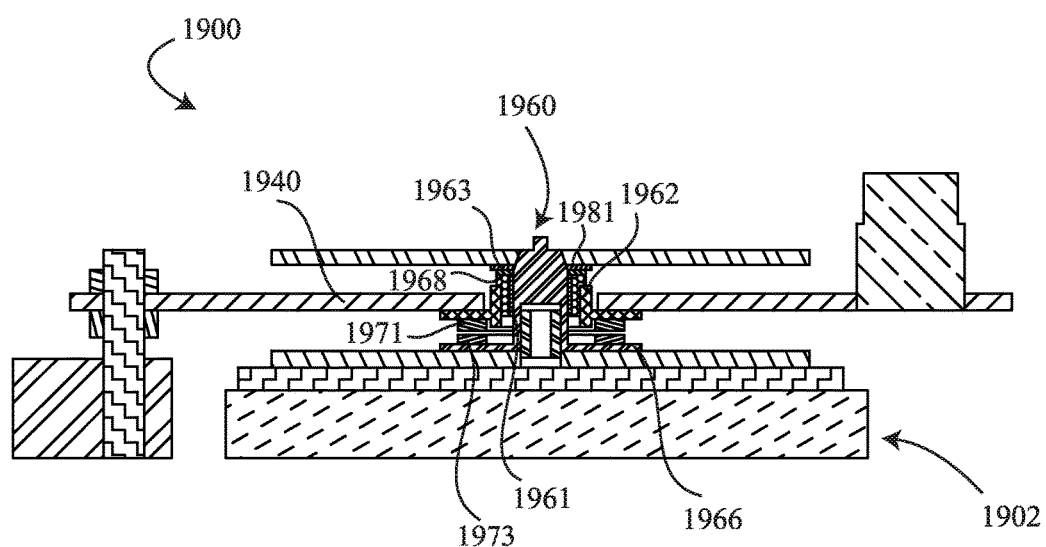
FIG. 19 is a cross-sectional view of a platter supported and driven turntable having ring magnets and a corresponding supporting turntable in examples of the present disclosure.

FIG. 19 is a cross-sectional view of a platter supported and driven turntable 1900 having an upper ring magnet 1971 and a lower ring magnet 1973 and a corresponding supporting turntable 1902 in examples of the present disclosure. The upper ring magnet 1971 is attached to the hub 1962. The lower ring magnet 1973 is attached to a flange 1966 of the shaft 1960. An arm board 1940 is directly attached to the hub 1962. In one example, a bottom surface of the upper ring magnet 1971 and a top surface of the lower ring magnet 1973 have a same polarity. The upper ring magnet 1971 and the lower ring magnet 1973 repel each other. A top surface of a metal plate 1981 is directly attached to a bottom surface of the upper circular platter. A bearing assembly is of a fluid dynamic bearing type. The bearing assembly comprises a bushing 1968, a first layer of oil 1961 and a second layer of oil 1963. The first layer of oil 1961 directly contacts an inner surface of the bushing 1968 and an outer surface of the shaft 1960. The second layer of oil 1963 directly contacts a top surface of the bushing 1968 and a bottom surface of the metal plate 1981.

Figure 20:
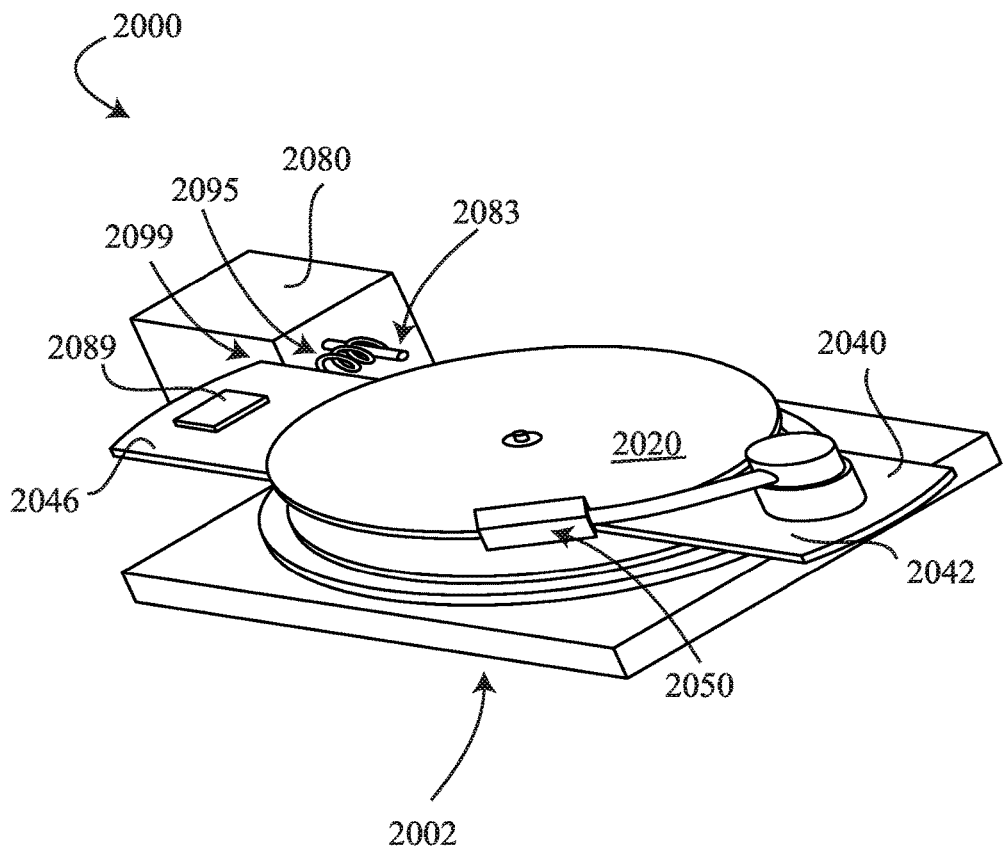
FIG. 20 is a perspective view of a platter supported and driven turntable mounted on a supporting turntable in examples of the present disclosure.

FIG. 20 is a perspective view of a platter supported and driven turntable 2000 mounted on a supporting turntable 2002 in examples of the present disclosure. An upper circular platter 2020 is configured to receive a record. An arm board 2040 has a first extension section 2042 and a second extension section 2046. A balancing weight 2089 is directly attached to the second extension section 2046 of the arm board 2040. A tonearm assembly 2050 is mounted on the first extension section 2042 of the arm board 2040. A ballast 2080 has an extended pin 2083. A spring 2095 connects the second extension section 2046 of the arm board 2040 to the ballast 2080. A first end of the spring 2095 is directly attached to the second extension section 2046 of the arm board 2040. A second end of the spring 2095 is directly attached to the extended pin 2083 of the ballast 2080. The upper circular platter 2020 rotates clockwise. The second extension section 2046 of the arm board 2040 directly contacts the ballast 2080 at a location 2099 during operation.

Figure 21:
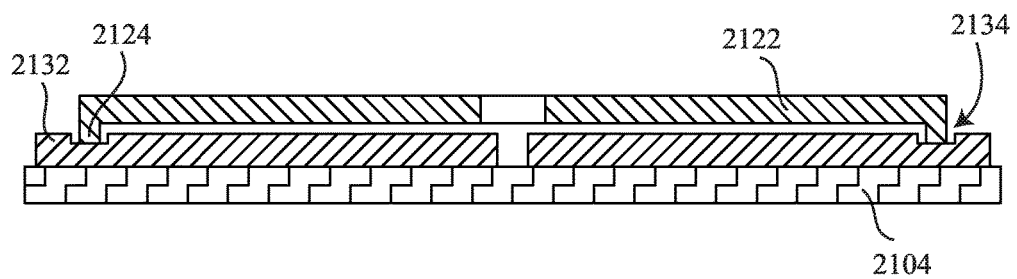
FIG. 21 is a partial, cross-sectional view of a platter supported and driven turntable having a mat between a lower circular platter and a supporting platter of a supporting turntable in examples of the present disclosure.

FIG. 21 is a partial, cross-sectional view of a platter supported and driven turntable having a mat 2132 between a lower circular platter 2122 and a supporting platter 2104 of a supporting turntable in examples of the present disclosure. The lower circular platter 2122 comprises a flange 2124 extending away from a bottom surface of the lower circular platter. The flange 2124 of the lower circular platter 2122 is of ring shape. The mat 2132 has a circular groove 2134 to receive the flange 2124 of the lower circular platter 2122. The groove 2134 facilitates alignment and centering of the lower circular platter 2122.

Figure 22:
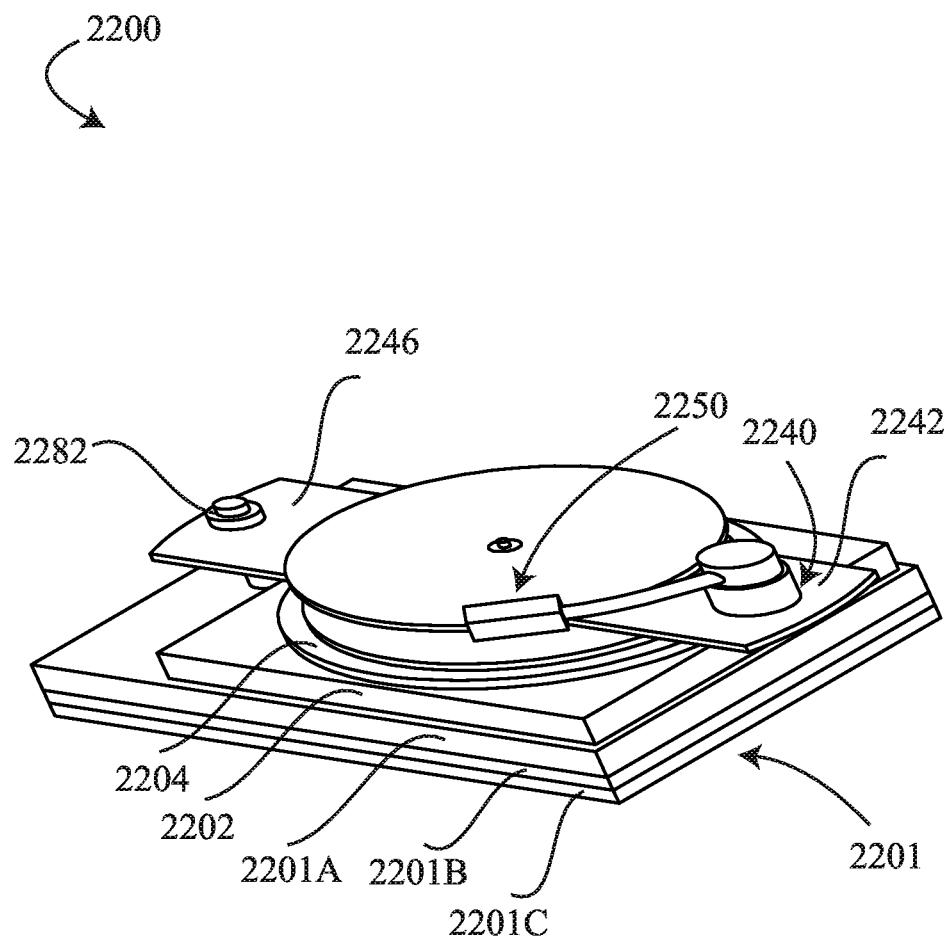
FIG. 22 is a perspective view of a platter supported and driven turntable mounted on a supporting turntable and a platform in examples of the present disclosure.

FIG. 22 is a perspective view of a platter supported and driven turntable 2200 mounted on a supporting platter 2204 of a supporting turntable 2202 and a platform 2201 in examples of the present disclosure. A bottom surface of the supporting turntable 2202 is directly attached to a top surface of the platform 2201. The arm board 2240 has a first extension section 2242 and a second extension section 2246. A tonearm assembly 2250 is directly attached to the first extension section 2242 of the arm board 2240. The second extension section 2246 of the arm board 2240 of the platter supported and driven turntable 2200 is attached to the platform 2201 through one or more adjustable height mounts 2282. In examples of the present disclosure, the platform 2201 includes a top layer 2201A, a constrained layer damper layer 2201B and a bottom layer 2201C.

Figure 23:
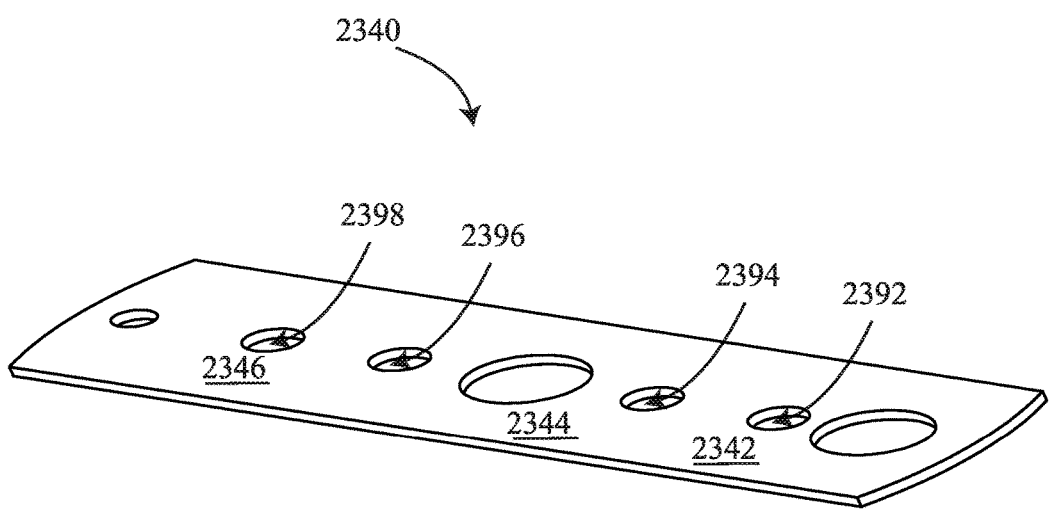
FIG. 23 is a perspective view of an arm board having holes in examples of the present disclosure.

FIG. 23 is a perspective view of an arm board 2340 having holes 2392, 2394, 2396, and 2398 in examples of the present disclosure. The arm board 2300 has a first extension section 2342, a mid-range section 2344, and a second extension section 2346. The holes 2392, 2394, 2396, and 2398 are for weight reduction of the arm board 2300. In examples of the present disclosure, the hole 2392 is located in the first extension section 2342 of the arm board 2340. The holes 2394 and 2396 are located in the mid-range section 2344 of the arm board 2340. The hole 2398 is located in the second extension section 2346 of the arm board 2340.

Figure 24:
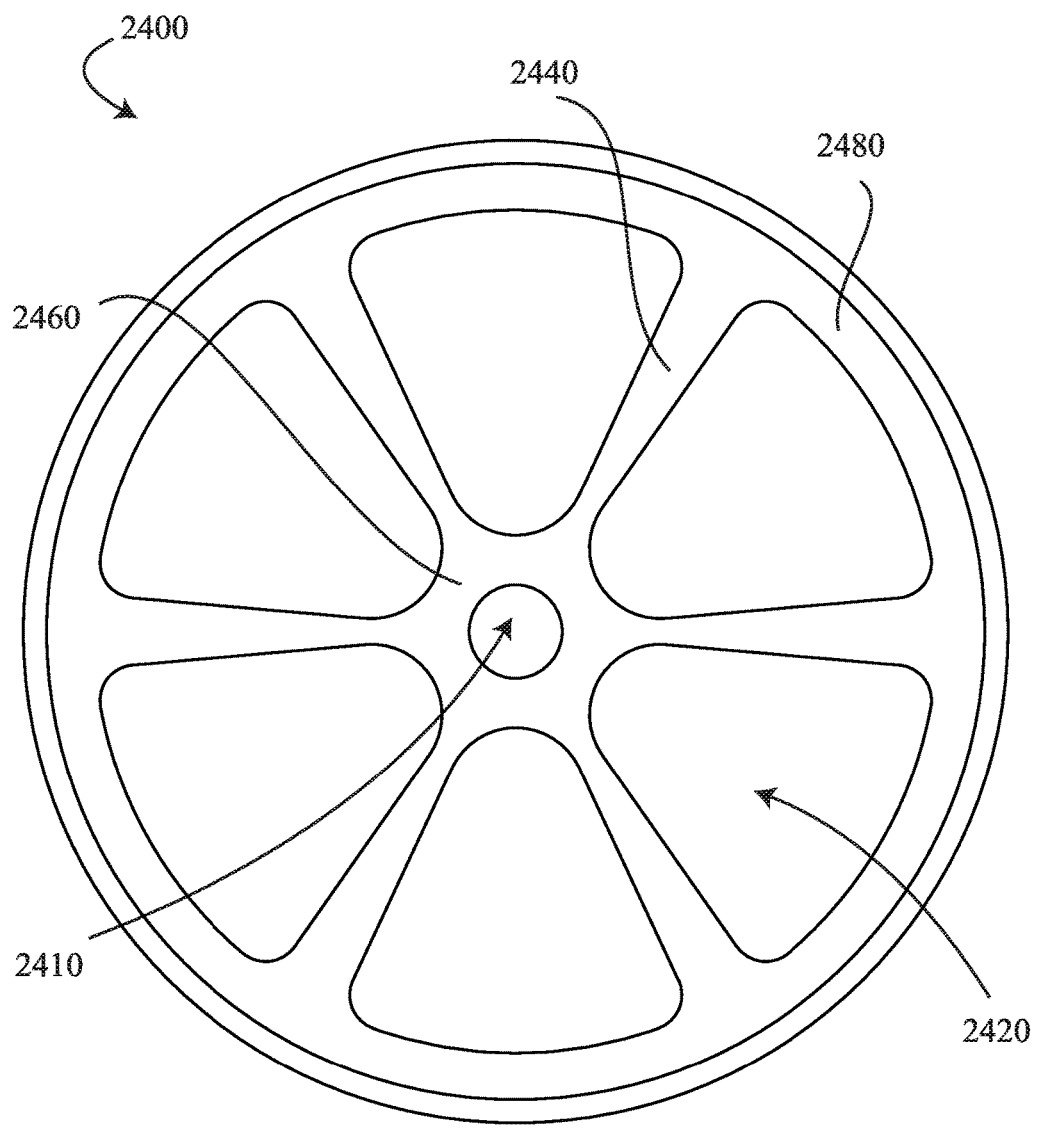
FIG. 24 is a top view of a lower circular platter having spokes in examples of the present disclosure.

FIG. 24 is a top view of a lower circular platter 2400 having a plurality of spokes 2440 in examples of the present disclosure. The hole 2410 at a center of the lower circular platter 2400 is to receive the record locating sub-spindle 1392 of FIG. 13. The plurality of spokes 2440 extend from a inner ring 2460 to an outer ring of 2480 forming a plurality of slots 2420. The slots 2420 are to reduce weight of the lower circular platter 2400.

Figure 25:
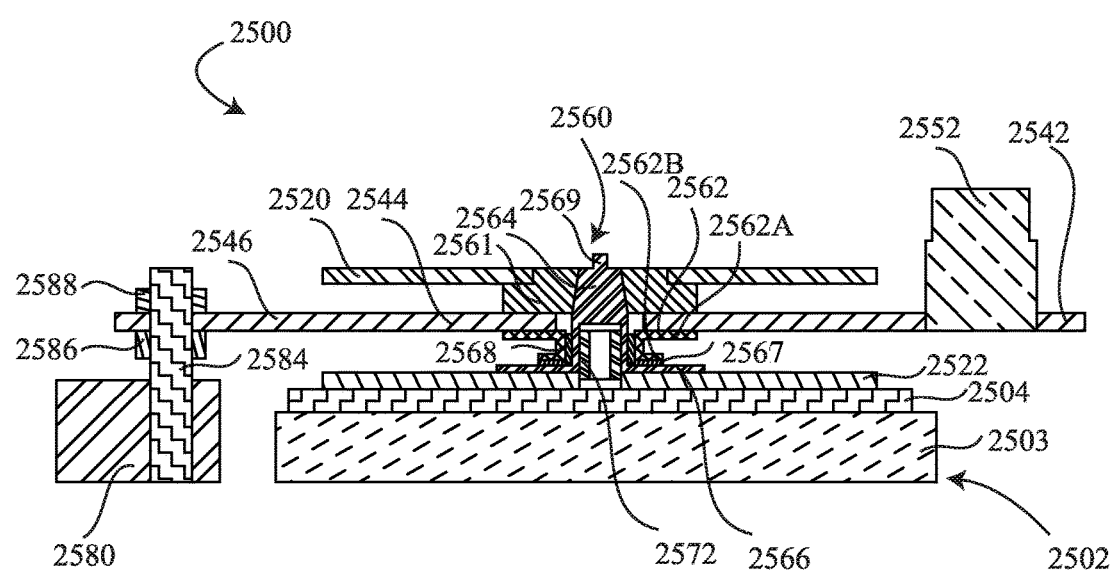
FIG. 25 is a cross-sectional view of the platter supported and driven turntable and the supporting turntable having a sleeve and a thrust washer in examples of the present disclosure.

FIG. 25 is a cross-sectional view of the platter supported and driven turntable 2500 and the supporting turntable 2502 having a sleeve 2568 and a thrust washer 2567 in examples of the present disclosure. The supporting turntable 2502 has a base 2503 and a supporting platter 2504. The platter supported and driven turntable 2500 has a spindle 2560, an upper circular platter 2520, and a lower circular platter 2522. The spindle 2560 has a hub 2561, a shaft 2564 and a bearing assembly. In examples of the present disclosure, the bearing assembly includes the sleeve 2568 and the thrust washer 2567. In one example, the sleeve 2568 is press-fitted into the thrust washer 2567. In another example, a bottom portion of the sleeve 2568 is directly attached to an inner surface of the thrust washer 2567. In one example, the sleeve 2568 is made of OILITE containing 18% oil by weight. The shaft 2564 includes a top record locating sub-spindle 2569. The upper circular platter 2520 is attached to the hub 2561. The lower circular platter 2522 is attached to the flange 2566 of the shaft 2564 of the spindle 2560. A viscoelastic cylinder 2572 is attached to an inner surface of the shaft 2564. An adjustable height mount includes a post 2584, a lower fastener 2586 and an upper fastener 2588. The arm board is secured between the lower fastener 2586 and the upper fastener 2588. The arm board has a first extension section 2542, a mid-range section 2544, and a second extension section 2546. The second extension section 2546 is directly attached to the ballast 2580. A tonearm assembly 2552 is directly attached to the first extension section 2542 of the arm board. A support member 2562 has an upper portion 2562A directly attached to the mid-range section 2544 of the arm board and a lower portion directly attached to the thrust washer 2567.

Those of ordinary skill in the art may recognize that modifications of the embodiments disclosed herein are possible. For example, a total number of the adjustable height legs may vary. Other modifications may occur to those of ordinary skill in this art, and all such modifications are deemed to fall within the purview of the present invention, as defined by the claims.

The invention claimed is:

1. A platter supported and driven turntable comprising:
a spindle to rotate about a first direction, the spindle comprising a hub, a shaft and a bearing assembly between the hub and the shaft;
an upper circular platter attached to the shaft of the spindle;
a lower circular platter attached to the shaft of the spindle;
an arm board attached to the hub of the spindle, the arm board having a first extension section, a mid-range section, and a second extension section opposite the first extension section, the mid-range section of the arm board being disposed between the upper circular platter and the lower circular platter; and a tonearm assembly directly attached to the first extension section of the arm board.

2. The platter supported and driven turntable of claim 1, wherein the platter supported and driven turntable is configured to be placed on a supporting turntable and wherein a top surface of the upper circular platter is configured to be placed under a record.

3. A method of using the platter supported and driven turntable of claim 2, the method comprising the steps of:
placing the platter supported and driven turntable on the supporting turntable; and
placing the top surface of the upper circular platter under the record.

4. The platter supported and driven turntable of claim 1 further comprising a balancing weight directly attached to the second extension section of the arm board.

5. The platter supported and driven turntable of claim 1 further comprising a balancing weight directly attached to the second extension section of the arm board and the mid-range section of the arm board.

6. The platter supported and driven turntable of claim 1, wherein the second extension section of the arm board of the platter supported and driven turntable is attached to a supporting turntable.

7. The platter supported and driven turntable of claim 1 further comprising a ballast, wherein the second extension section of the arm board is attached to the ballast.

8. The platter supported and driven turntable of claim 7, wherein the ballast includes one or more adjustable height mounts and wherein the second extension section of the arm board is directly attached to the one or more adjustable height mounts.

9. The platter supported and driven turntable of claim 7, wherein the ballast has one or more adjustable height legs.

10. The platter supported and driven turntable of claim 7, wherein a top surface of the arm board is of a rectangular shape.

11. The platter supported and driven turntable of claim 7, wherein the mid-range section is wider than the first extension section and wherein the mid-range section is wider than the second extension section.

12. The platter supported and driven turntable of claim 7, wherein the arm board has a first side edge and a second side edge and wherein the first side edge and the second side edge are of saw-teeth shapes.

13. The platter supported and driven turntable of claim 7, wherein the arm board has a first side edge and a second side edge; wherein the first side edge and the second side edge are of wavy shapes and wherein an outer profile of the arm board forms a rotational symmetry of order 2 about the first direction.

14. The platter supported and driven turntable of claim 7, wherein the arm board comprises a plurality of layers along the first direction and wherein the plurality of layers are made of materials selected from the group consisting of metals and woods.

15. The platter supported and driven turntable of claim 7 further comprising a spacer ring attached to a bottom surface of the lower circular platter.

16. The platter supported and driven turntable of claim 15, wherein a cross section of the spacer ring is of a rectangular shape, a trapezoidal shape or a circular shape.

17. The platter supported and driven turntable of claim 15 further comprising a damping layer attached to a bottom surface of the spacer ring.

18. The platter supported and driven turntable of claim 7, wherein the lower circular platter comprises a flange extending away from a bottom surface of the lower circular platter;
wherein a cross section of the flange of the lower circular platter is of a letter L shape;
wherein a damping material is attached to two sides of the flange of the lower circular platter; and
wherein the damping material is configured to directly contact a top surface and a side surface of a supporting platter of a supporting turntable.

19. The platter supported and driven turntable of claim 7, wherein the shaft of the spindle comprises a recess to receive a viscoelastic cylinder.

20. The platter supported and driven turntable of claim 7, wherein the upper circular platter has a tapered circular hole at a center of the upper circular platter and wherein a peripheral length of a bottom of the tapered circular hole is larger than a peripheral length of a top of the tapered circular hole.

21. The platter supported and driven turntable of claim 1, wherein the shaft of the spindle and the lower circular platter are a single piece construction.

22. The platter supported and driven turntable of claim 1, wherein the bearing assembly comprises an upper ball bearing, a spacer and a lower ball bearing and wherein the spacer is between the upper ball bearing and the lower ball bearing along the first direction.

23. The platter supported and driven turntable of claim 1, wherein the bearing assembly is of a fluid dynamic bearing type; wherein the bearing assembly comprises a bushing, a first layer of oil and a second layer of oil; wherein a reservoir is located above a flange of the shaft of the spindle; wherein the first layer of oil directly contacts an inner surface of the bushing and an outer surface of the shaft of the spindle; and wherein the second layer of oil directly contacts a bottom surface of the bushing and a top surface of the flange of the shaft of the spindle.

24. The platter supported and driven turntable of claim 1, wherein an upper ring magnet is attached to the hub;
wherein a lower ring magnet is attached to a flange of the shaft;
wherein a top surface of a metal plate is directly attached to a bottom surface of the upper circular platter;
wherein the bearing assembly is of a fluid dynamic bearing type;
wherein the bearing assembly comprises a bushing, a first layer of oil and a second layer of oil;
wherein the first layer of oil directly contacts an inner surface of the bushing and an outer surface of the shaft of the spindle; and
wherein the second layer of oil directly contacts a top surface of the bushing and a bottom surface of the metal plate.

25. The platter supported and driven turntable of claim 1 further comprising a ballast, wherein an elastic band connects the second extension section of the arm board to the ballast; wherein a first end of the elastic band is directly attached to the second extension section of the arm board and wherein a second end of the elastic band is directly attached to the ballast.

26. The platter supported and driven turntable of claim 1, wherein three or more legs extend away from the arm board; wherein a bottom surface of the lower circular platter is directly attached to a top surface of a supporting platter of a supporting turntable and wherein a length of the three or more legs is longer than a height of the supporting turntable.

27. The platter supported and driven turntable of claim 1, wherein the platter supported and driven turntable is configured to be placed on a supporting turntable; wherein a top surface of the upper circular platter is configured to be placed under a record; wherein the supporting turntable is configured to be placed on a platform; and wherein one or more adjustable height mounts connect the second extension section of the arm board to the platform.

28. The platter supported and driven turntable of claim 27, wherein the lower circular platter comprises a flange extending away from a bottom surface of the lower circular platter;
   wherein a mat is disposed between the lower circular platter and a supporting platter of the supporting turntable; and
   wherein the mat includes a circular groove to receive the flange of the lower circular platter.

29. The platter supported and driven turntable of claim 1, wherein the lower circular platter comprises an inner ring, an outer ring, and a plurality of spokes extending from the inner ring to the outer ring forming a plurality of slots.

30. The platter supported and driven turntable of claim 1, wherein the bearing assembly comprises a thrust washer and a sleeve directly attached to the thrust washer.

\* \* \* \* \*